United States Patent
Builta et al.

(10) Patent No.: US 7,931,238 B2
(45) Date of Patent: Apr. 26, 2011

(54) AUTOMATIC VELOCITY CONTROL SYSTEM FOR AIRCRAFT

(75) Inventors: Kenneth E. Builta, Euless, TX (US); Kynn J. Schulte, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 468 days.

(21) Appl. No.: 12/064,476

(22) PCT Filed: Sep. 12, 2005

(86) PCT No.: PCT/US2005/032375
§ 371 (c)(1),
(2), (4) Date: Feb. 22, 2008

(87) PCT Pub. No.: WO2007/032757
PCT Pub. Date: Mar. 22, 2007

(65) Prior Publication Data
US 2008/0308682 A1    Dec. 18, 2008

(51) Int. Cl.
*G05D 1/08* (2006.01)
(52) U.S. Cl. ............ 244/182; 244/194; 244/195; 701/4; 60/233
(58) Field of Classification Search .................. 244/182, 244/194, 195; 60/233, 239; 701/4, 11, 12; 340/945, 963
See application file for complete search history.

(56) References Cited

U.S. PATENT DOCUMENTS

| 2,948,496 | A | * | 8/1960 | Joline ........................... 244/182 |
| 3,840,200 | A | * | 10/1974 | Lambregts ..................... 244/182 |
| 4,189,119 | A | * | 2/1980 | Peter-Contesse et al. .... 244/182 |
| 4,245,805 | A | * | 1/1981 | Stephan ........................ 244/188 |
| 4,422,147 | A | * | 12/1983 | Hanke ........................... 701/121 |
| 4,853,861 | A | * | 8/1989 | Ford et al. ....................... 701/14 |
| 5,359,888 | A | * | 11/1994 | Hagen ......................... 73/178 R |
| 5,553,812 | A | * | 9/1996 | Gold et al. .................. 244/76 R |
| 6,298,286 | B1 | * | 10/2001 | Ying .................................. 701/4 |
| 2004/0093130 | A1 | * | 5/2004 | Osder et al. ...................... 701/3 |

* cited by examiner

*Primary Examiner* — Tien Dinh
*Assistant Examiner* — Justin Benedik
(74) *Attorney, Agent, or Firm* — James E. Walton; Richard G. Eldredge

(57) ABSTRACT

A flight control system for an aircraft receives a selected value of a first parameter, which is either the airspeed or inertial velocity of the aircraft. A primary feedback loop generates a primary error signal that is proportional to the difference between the selected value and a measured value of the first parameter. A secondary feedback loop generates a secondary error signal that is proportional to the difference between the selected value of the first parameter and a measured value of a second flight parameter, which is the other of the airspeed and inertial velocity. The primary and secondary error signals are summed to produce a velocity error signal, and the velocity error signal and an integrated value of the primary error signal are summed to produce an actuator command signal. The actuator command signal is then used for operating aircraft devices to control the first parameter to minimize the primary error signal.

16 Claims, 12 Drawing Sheets

Airspeed Control System Response to head-on gust

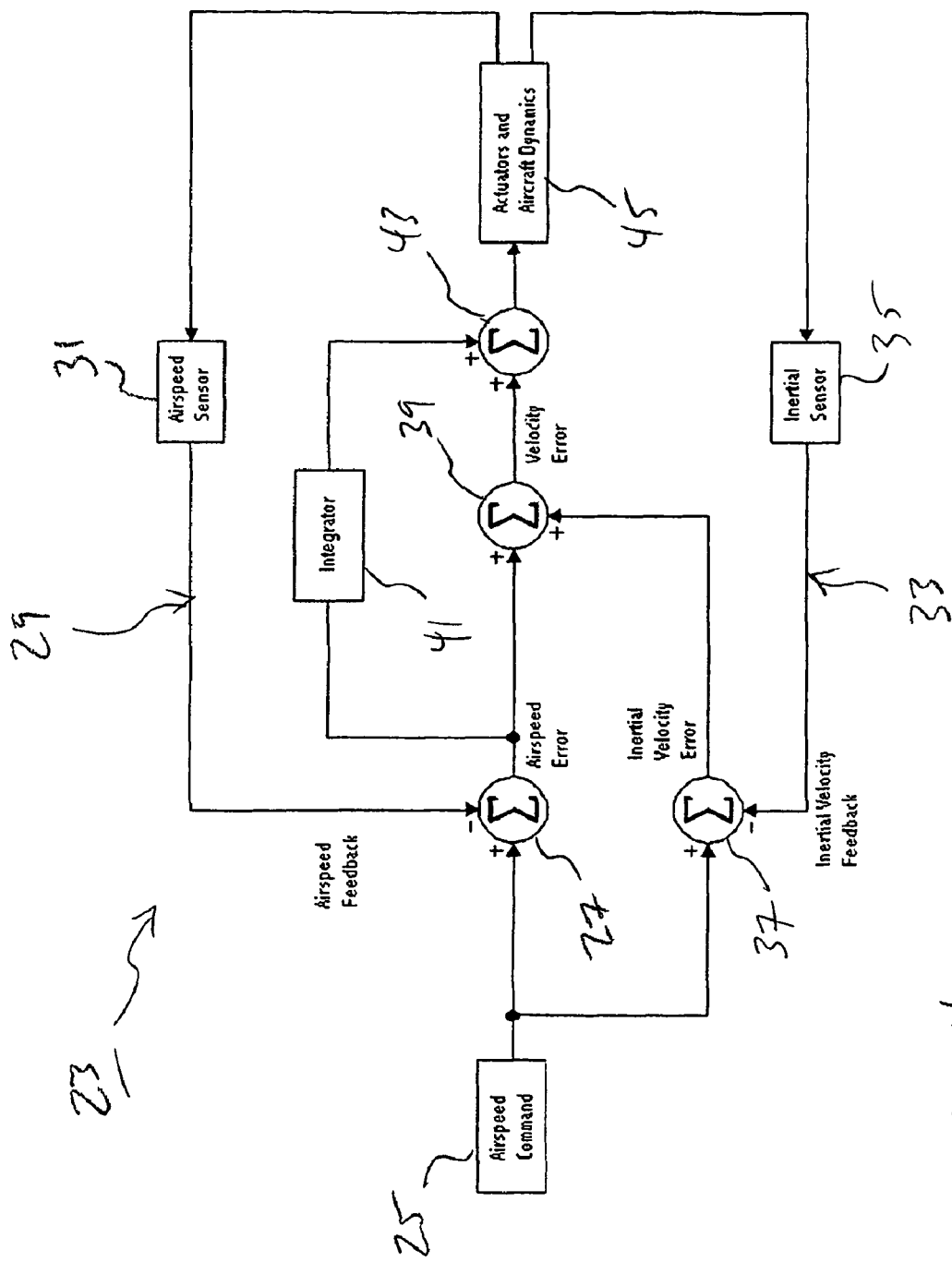

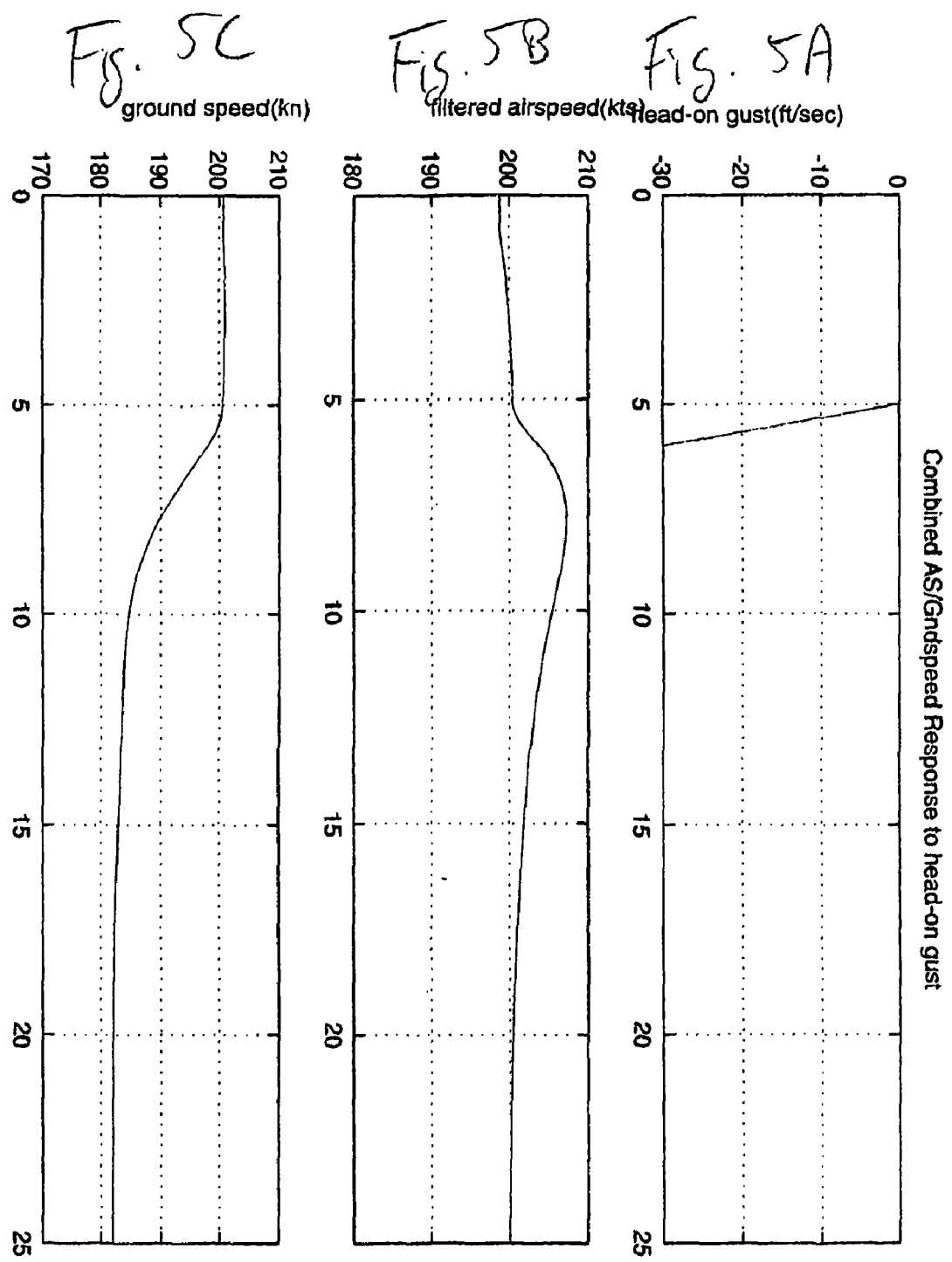

AUTOMATIC VELOCITY CONTROL SYSTEM FOR AIRCRAFT

TECHNICAL FIELD

The present invention relates generally to the field of flight control systems for aircraft and relates particularly to a system for automatically controlling the velocity of an aircraft.

DESCRIPTION OF THE PRIOR ART

Many modern aircraft have flight control systems for maintaining selected flight parameters at or near selected values. These parameters may include altitude, heading, attitude, and/or airspeed, and the control system maintains each parameter by operating flight control systems of the aircraft. For example, altitude may be controlled through use of flight control surfaces, such as elevators, or through use of the throttle to control the airspeed of the aircraft. These flight control systems are usually closed-loop feedback control systems, allowing for the input from the control system to respond to changes in the controlled parameter.

Typical closed-loop systems control the velocity of the aircraft using either the airspeed or the inertial velocity. Airspeed is defined as the forward velocity of the aircraft relative to the air mass in which the aircraft is flying, whereas inertial velocity is defined as the forward velocity of the aircraft relative to the ground over which the aircraft is flying. The flight control system compares the commanded velocity (airspeed or inertial velocity) to the measured velocity, and the difference between the commanded velocity and the measured velocity is the velocity error. When the velocity error is not zero, the control system inputs a corrective command to one or more system of the aircraft, such as throttles in a fixed-wing aircraft or rotor blade pitch in a helicopter, to increase or decrease the measured velocity in order to achieve a zero velocity error. Typically, the corrective command is proportional to the velocity error A schematic view of a typical prior-art airspeed control system is shown in FIG. 1. System 11 comprises a command input device 13 for sending commands to aircraft actuators 15, and the airspeed of the aircraft is measured by a sensor 17 in feedback loop 19. The airspeed command from device 13 and the negative of the measured airspeed output from sensor 17 are summed at node 21, producing an airspeed error signal sent to actuators 15. System 11 operates actuators 15 to reduce this airspeed error signal to zero.

In calm air, typical closed-loop feedback systems operate to control airspeed fairly well. However, an aircraft flying in a turbulent-air environment will pass from an air mass moving in one direction into an air mass moving in another direction. The effects of this turbulence will cause positive and negative longitudinal acceleration forces on the aircraft. These accelerations change the airspeed and inertial velocity of the aircraft, which creates a velocity error that the control system attempts to eliminate. In a fixed-wing aircraft, the control system will command a change in the throttle position, which changes engine power and produce additional accelerations. In helicopters or other rotary-wing aircraft, such as tiltrotors, the control system may command a change in the throttle position, engine nacelle position, and/or blade pitch inputs, which can also cause a change in pitch attitude of o the aircraft. Changes in engine power and pitch attitude are transmitted into the cabin of the aircraft, producing undesirable acceleration and motion effects on passengers.

An example will illustrate the effects of turbulent air on the operation of a flight control system, such as system 11, which is commanded to maintain a selected airspeed. FIGS. 2A through 2E are graphs over time of the input and response for a sustained head-on gust using the prior-art system of FIG. 1, and FIGS. 3A through 3E are similar graphs showing the input and response for a transient head-on gust.

In an aircraft flying through air that has no velocity (calm air), the control system measures little or no velocity error, and the accelerations caused by negligible changes in throttle input are not felt by the passengers. However, when the aircraft encounters air that is moving in the opposite direction of the aircraft, the airspeed sensor will detect the increased airspeed. For example, graph 2A shows the results of a sustained 30 ft/sec head-on gust encountered at 5 seconds on the timeline and which ramps to its maximum value in approximately 1 second. The gust causes the measured airspeed, shown in FIG. 2B, to rise from the commanded airspeed of 200 kts to approximately 207 kts at around 7.5 seconds. This also causes a decrease in groundspeed, as shown in FIG. 2C. In response to the increased airspeed, control system 11 commands a change in throttle position to reduce engine power in order to achieve the original airspeed. The throttle position versus time is shown in FIG. 2D, and the position is decreased from about 36 degrees just before the gust is encountered to about 12 degrees afterward at 8 seconds, reducing engine power. The aircraft is thus decelerated to an even slower groundspeed, reaching a total decrease in groundspeed of 30 kts at about 14 seconds.

After peaking at 207 kts, the airspeed begins to decrease due to the reduction in engine power, and the airspeed falls below 200 kts at around 11 seconds. Simultaneously, the throttle position is ramping up to increase engine power to attain and maintain the commanded airspeed, but control system 11 causes throttle position overshoot that does not settle out until approximately 35 seconds. In addition to the longitudinal velocities, the vertical velocity of the aircraft is affected, as shown in FIG. 2E, with a +8 ft/sec maximum and a −9 ft/sec minimum.

When the aircraft moves back into a stationary air mass (zero wind speed), the measured airspeed will be less than the commanded airspeed. The control system then commands a change in throttle position to increase engine power, causing acceleration of the aircraft back to the original airspeed and the original groundspeed.

Similar effects occur in the case of a transient head-on gust. FIGS. 3B through 3E show the results of a 30 ft/sec head-on gust that is encountered for 5 seconds, as shown in FIG. 3A. As shown in FIG. 3B, the gust causes the measured airspeed to rise to 210 kts at about 7 seconds as the groundspeed decreases, as shown in FIG. 3C. In response to the increased airspeed, control system 11 commands a change in throttle position to reduce engine power in order to achieve the original airspeed. The throttle position versus time is shown in FIG. 3D, and the position is decreased from about 36 degrees just before the gust is encountered to about 22 degrees afterward at about 7 seconds, reducing engine power. The aircraft is thus decelerated to an even slower groundspeed, reaching a total decrease in groundspeed of 23 kts at about 11 seconds.

After peaking at 210 kts, the airspeed begins to decrease due to the reduction in engine power, and the airspeed falls below 200 kts at around 9.5 seconds. Simultaneously, the throttle position is ramping up to increase engine power to attain and maintain the commanded airspeed, but control system 11 causes throttle position overshoot that does not settle out until approximately 35 seconds. The longitudinal acceleration is graphed in FIG. 3E, with an initial 8 ft/sec/sec maximum deceleration followed by a 7 ft/sec/sec maximum acceleration.

The combination of the positive and negative accelerations due to the behavior of system 11 causes undesirable effects on the passengers of the aircraft. The initial deceleration caused by a sustained or transient gust is worsened by the accelerations due to the large undershoot and overshoot of the throttle position.

SUMMARY OF THE INVENTION

There is a need for an automatic control system for controlling the airspeed of aircraft that minimizes the undesirable accelerations encountered by passengers on the aircraft.

Therefore, it is an object of the present invention to provide for an automatic control system for controlling the airspeed of aircraft that minimizes the undesirable accelerations encountered by passengers on the aircraft.

A flight control system for an aircraft receives a selected value of a first parameter, which is either the airspeed or inertial velocity of the aircraft. A primary feedback loop generates a primary error signal that is proportional to the difference between the selected value and a measured value of the first parameter. A secondary feedback loop generates a secondary error signal that is proportional to the difference between the selected value of the first parameter and a measured value of a second flight parameter, which is the other of the airspeed and inertial velocity. The primary and secondary error signals are summed to produce a velocity error signal, and the velocity error signal and an integrated value of the primary error signal are summed to produce an actuator command signal. The actuator command signal is then used for operating aircraft devices to control the first parameter to minimize the primary error signal. o The present invention provides for several advantages, including: (1) reduction of unwanted longitudinal acceleration caused by automatic responses to head-on gusts and air turbulence; (2) reduction of the automatic engine power changes caused as a response to air turbulence; (3) increase of the stability for a flight control system, thus reducing the overshoots and undershoots caused by turbulence and commanded changes; and (4) improvement of the efficiency of the aircraft by reducing accelerations caused by the air turbulence.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which:

FIG. 4 is a schematic view of the components of a preferred embodiment of a flight control system according to the present invention;

FIGS. 5A through 5E are graphs over time of the input and response for a sustained head-on gust using the system of FIG. 4;

DESCRIPTION OF THE PREFERRED EMBODIMENT

Figure 1:
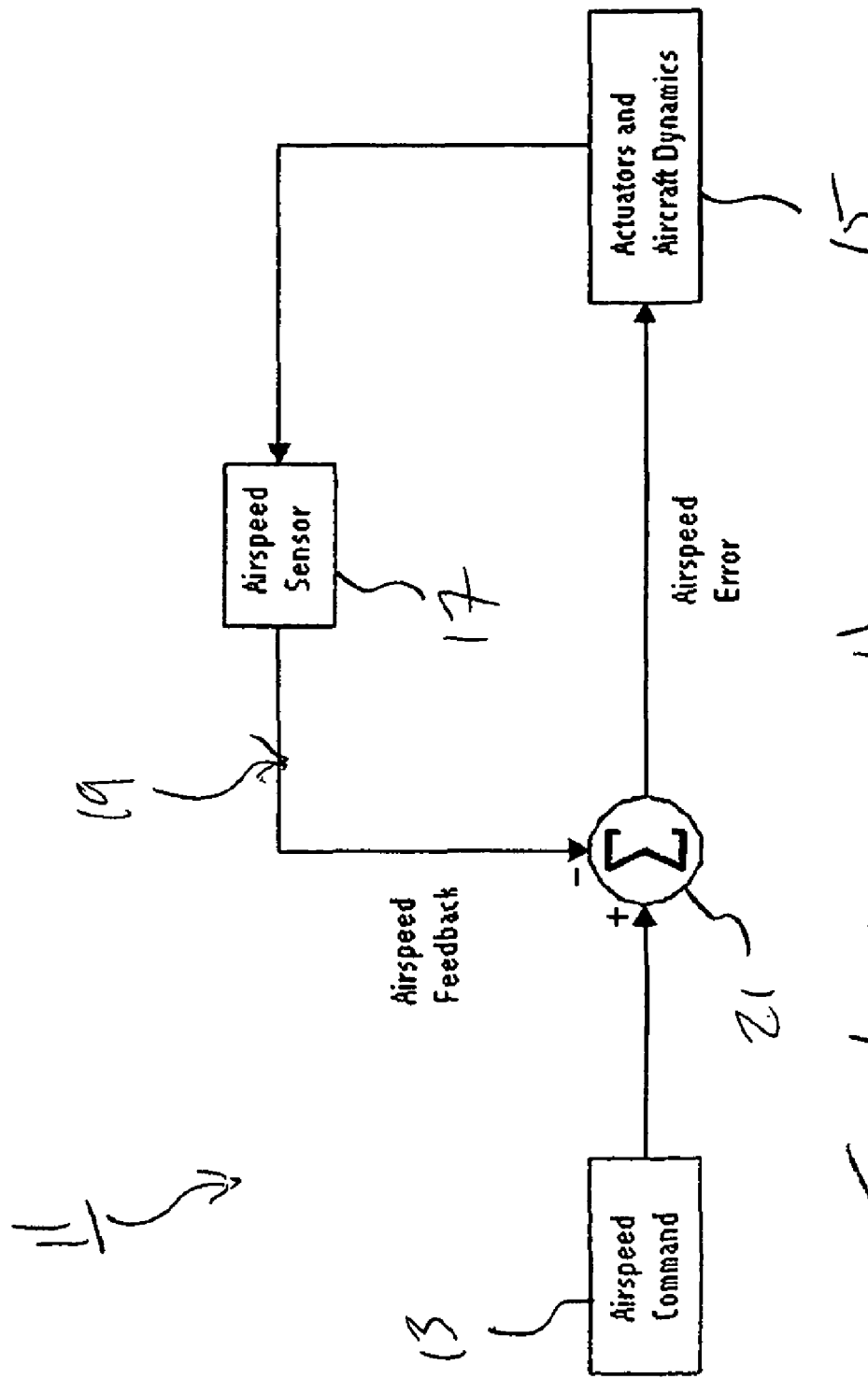
FIG. 1 is a schematic view of the components of a prior-art flight control system.
Figure 2A:
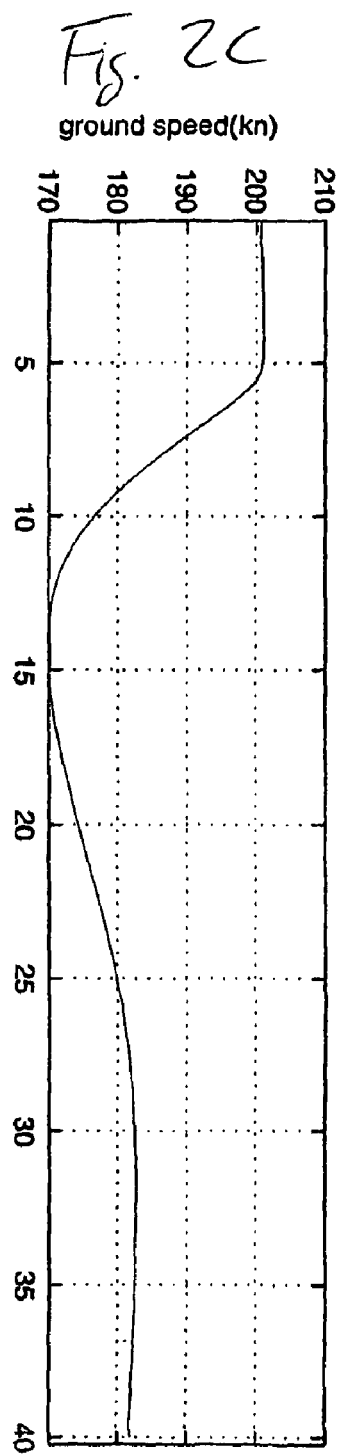
FIGS. 2A through 2E are graphs over time of the input and response for a sustained head-on gust using the prior-art system of FIG. 1.
Figure 2B:
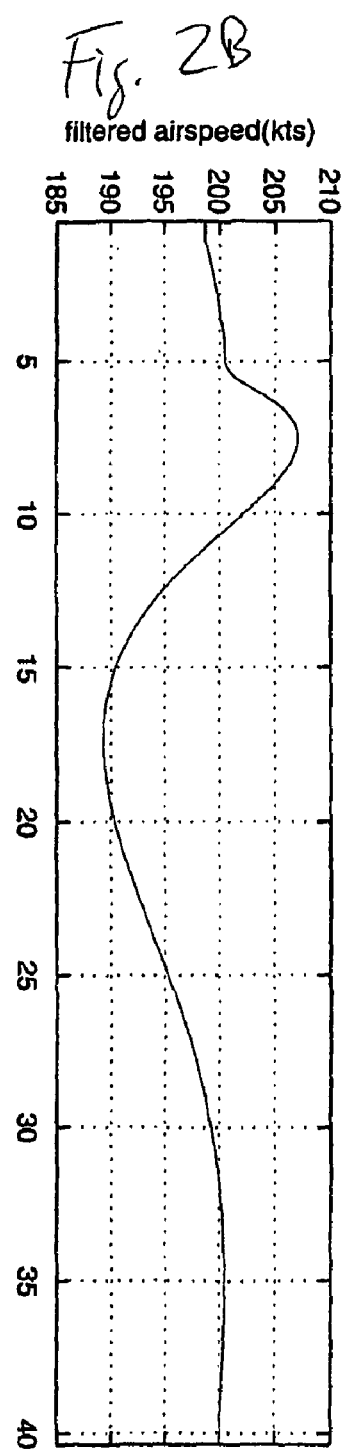
Figure 2C:
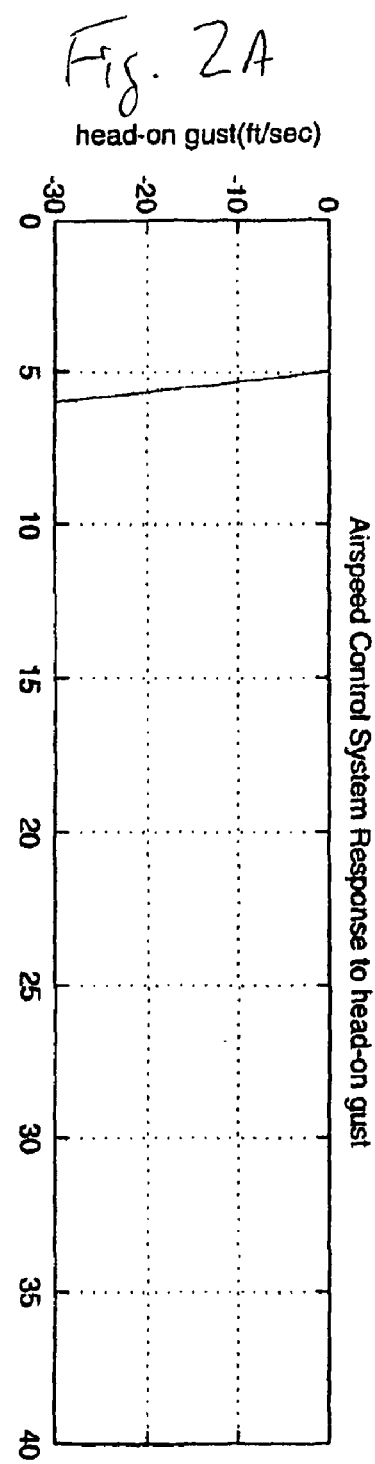
Figure 2E:
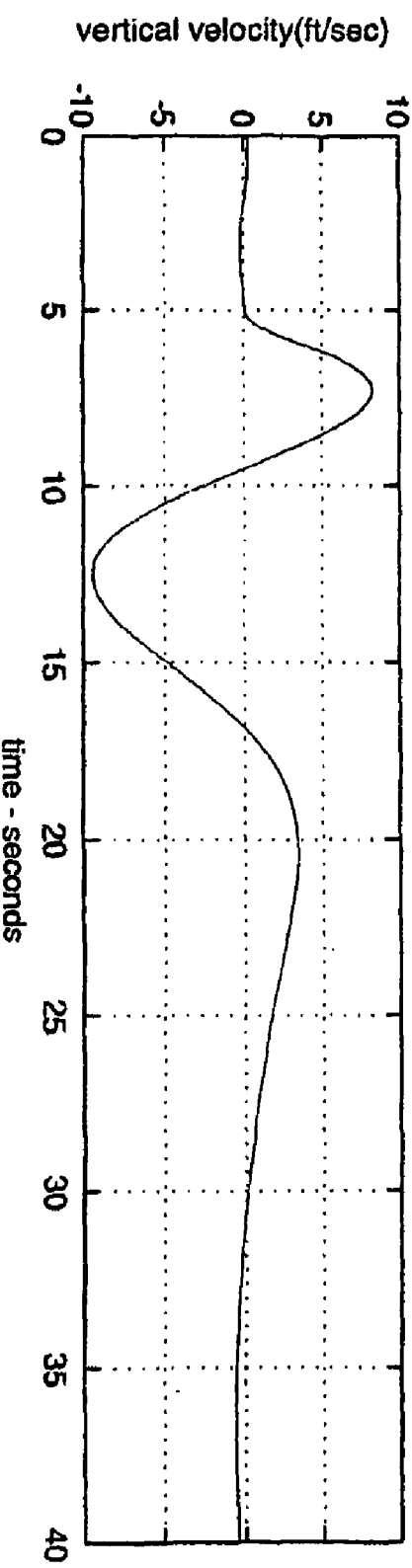
Figure 2D:
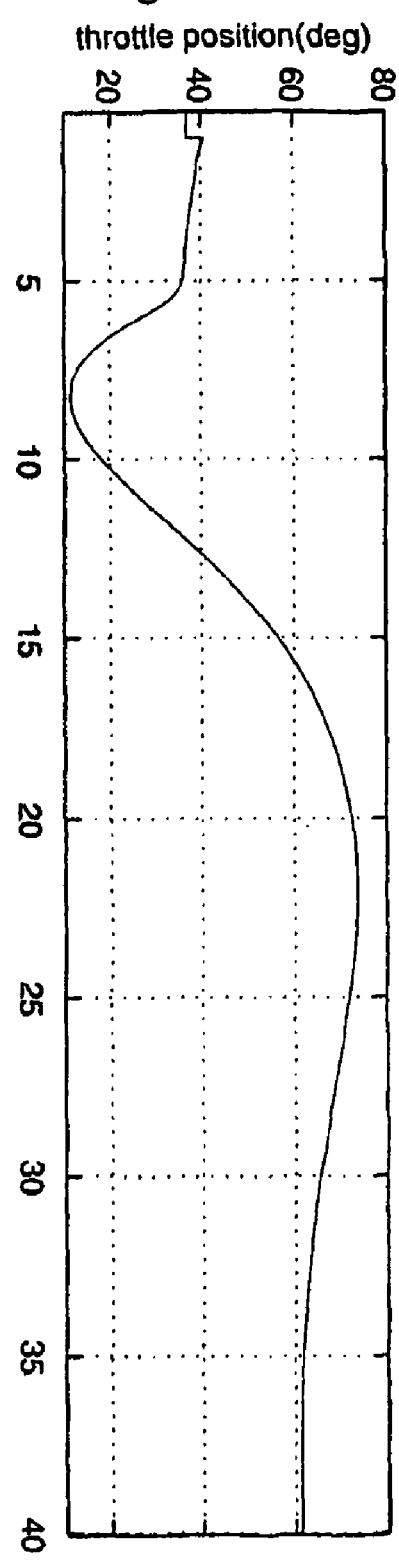
Figure 3A:
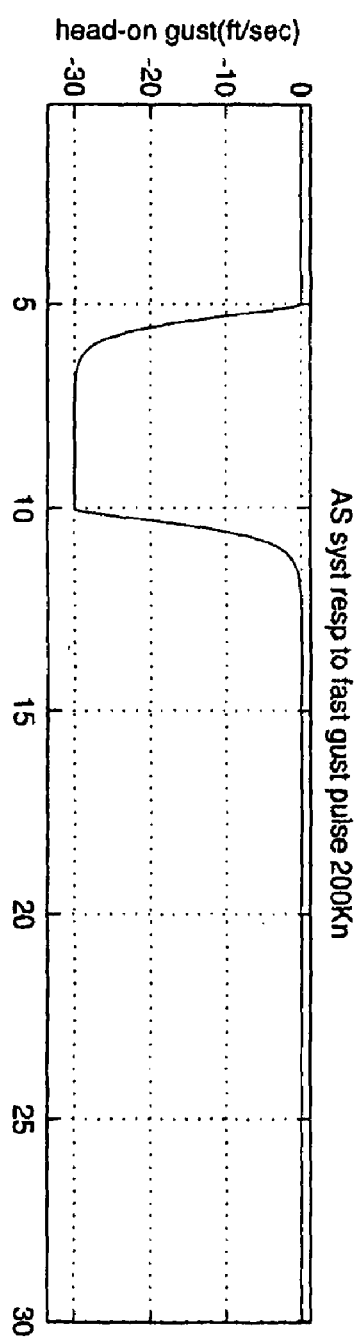
FIGS. 3A through 3E are graphs over time of the input and response for a transient head-on gust using the prior-art system of FIG. 1.
Figure 3B:
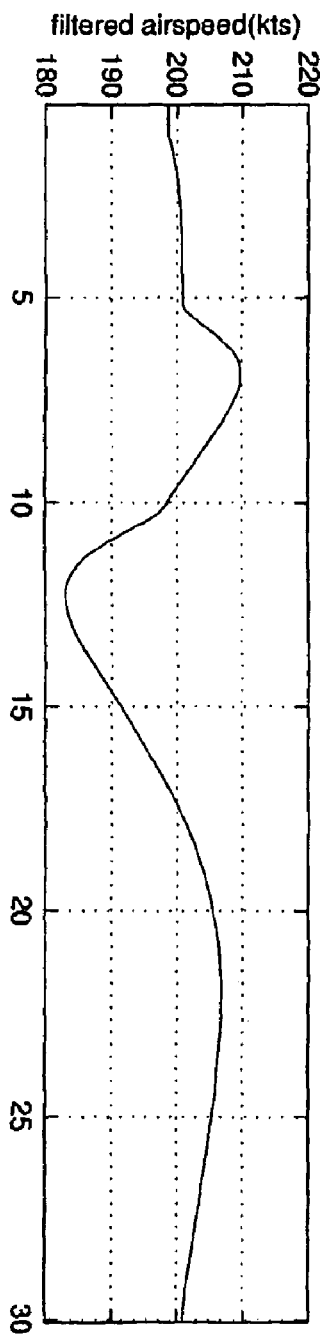
Figure 3C:
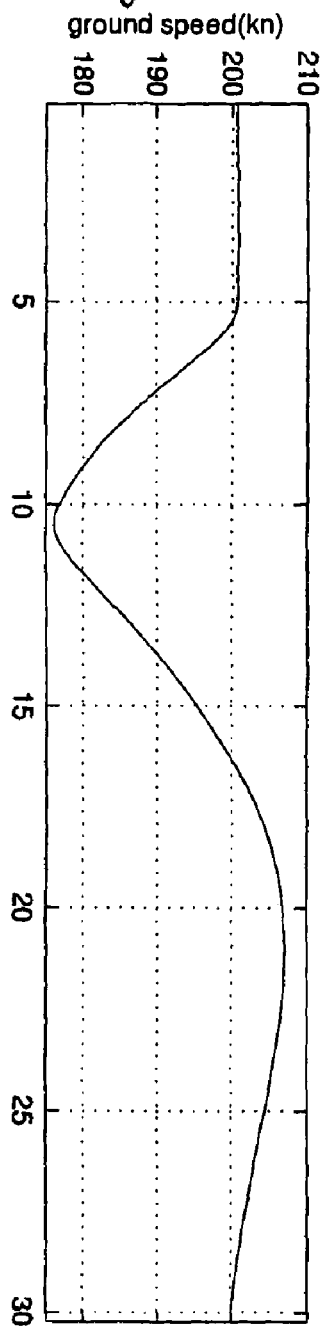
Figures 3D, 3E:
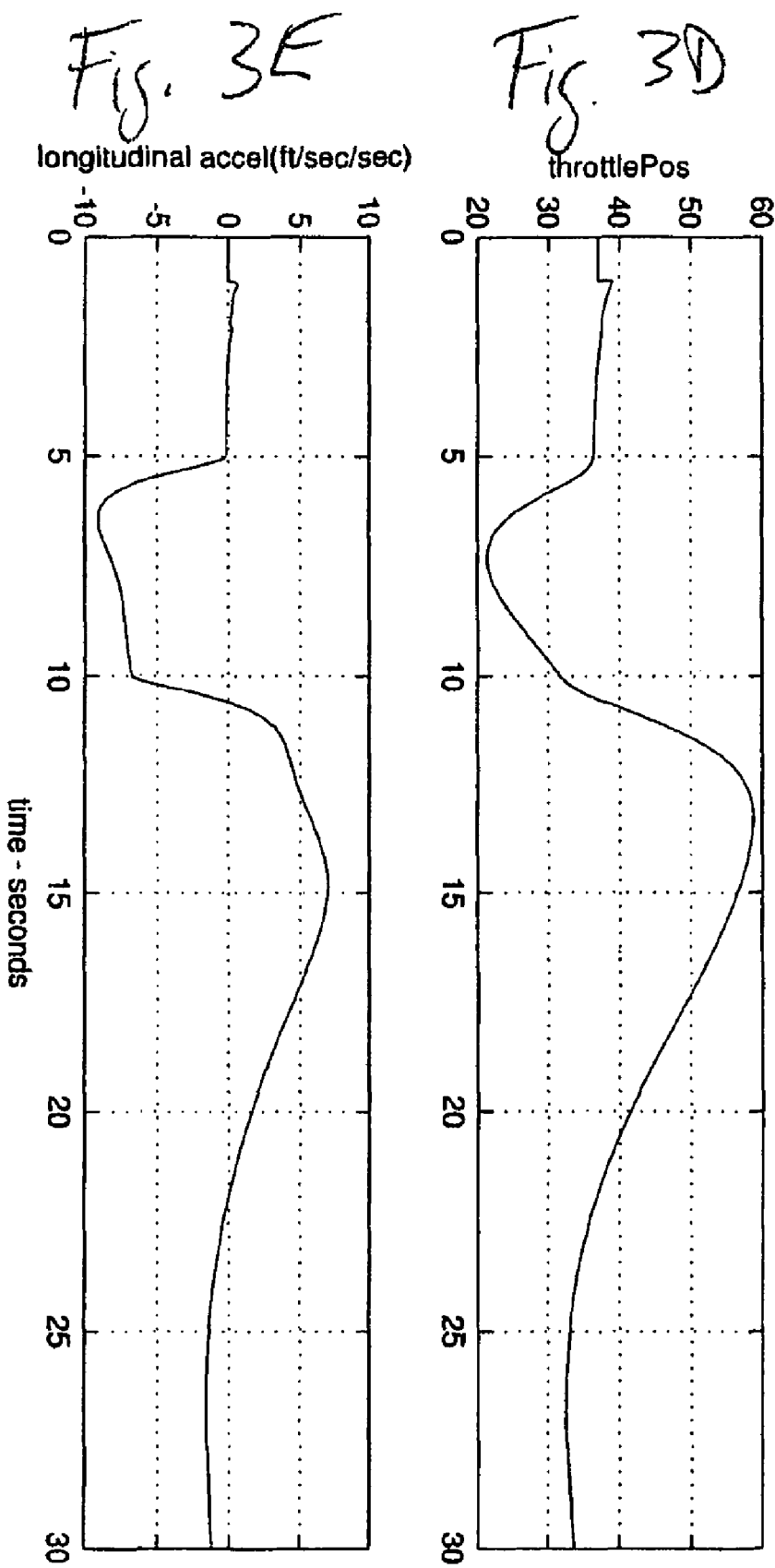

The present invention is directed to an airspeed control system configured for automatically controlling the airspeed of an aircraft and reducing the longitudinal accelerations due to air turbulence encountered during flight. When a wind gust having a longitudinal component is detected, the system of the invention uses the combination of an airspeed signal and an inertial velocity (longitudinal ground speed) signal as the velocity feedback signal for the control system. In calm air, the steady-state airspeed and inertial velocity are the same value.

Referring to the figures, FIG. 4 shows a schematic view of a preferred embodiment of the control system of the invention in which a selected airspeed is commanded by the operator or pilot. System 23 is a closed-loop feedback system that uses both airspeed and inertial velocity (ground speed) to determine the appropriate throttle response to changes in airspeed. In the system shown, a selected airspeed signal is output from a command device 25, which may be an onboard interface used by a pilot or a control system, such as an autopilot system. Alternatively, command device 25 may interface with a receiver that receives commands transmitted from a location remote from the aircraft, such as with an unmanned or remotely piloted vehicle. The airspeed command signal is summed at node 27 with a signal output from airspeed feedback loop 29, which is the primary feedback loop. An airspeed sensor 31 is in data communication with airspeed feedback loop 29 for providing a signal representing the measured airspeed of the aircraft, and the negative value of the measured airspeed is summed with the commanded airspeed at node 27 to calculate an airspeed error signal. Likewise, an inertial velocity, or groundspeed, feedback loop 33 provides a signal representing a value of inertial velocity measured by an inertial velocity sensor 35 in data communication with feedback loop 33. In this embodiment, the inertial velocity feedback loop 33 is the secondary feedback loop. The negative value of the inertial velocity measured by sensor 35 is summed with the commanded airspeed at node 37 to calculate an inertial velocity error.

The airspeed error calculated at node 27 is used in two subsequent calculations. The inertial velocity error (calculated at node 37) is summed with the positive value of the airspeed error at node 39 to calculate a velocity error. The integral value of airspeed error is calculated using integrator 41, and the positive value of this integral value is summed with the positive value of the velocity error at node 43. The output signal from node 43 represents the actuator command signal used by actuators or other devices represented by box 45 for controlling the airspeed of the aircraft such that the airspeed is minimized.

By using the combination of an airspeed signal and an inertial velocity signal as the velocity feedback signal, the dynamic combination of these two signals will reduce the amplitude of the changes commanded by system 23 caused by air turbulence were only airspeed sensor 31 used. Sensors 31, 35 indicate velocity errors in opposite directions, but because the proportional velocity error is computed from the combination of these two signals, the undesirable acceleration is significantly less due to the cancellation effect of these two signals. However, the low-frequency, or steady-state, velocity error used for the integral of velocity error is determined by airspeed sensor 31 only, so the steady airspeed is not affected by the inertial velocity signal. The improved response can be seen in FIGS. 5A through 5E and FIGS. 6A through 6E, which are graphs showing the input and improved response for head-on gusts of the same velocity and duration as those graphed for prior-art control system 11 in FIGS. 2A through 2E and FIGS. 3A through 3E, respectively.

Figures 5D, 5E:
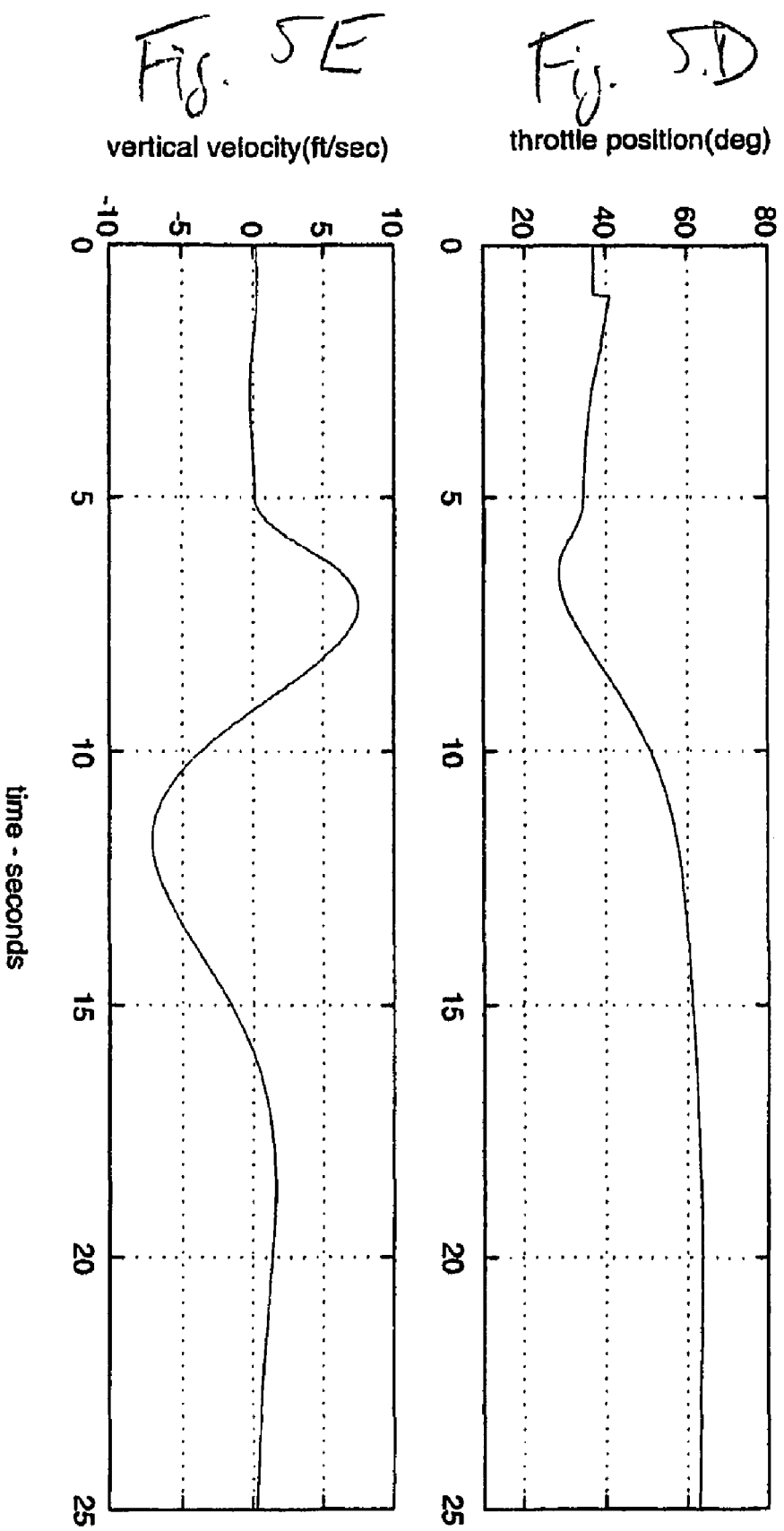

For example, the graph in FIG. 5A shows that a sustained 30 ft/sec head-on gust is encountered at 5 seconds on the timeline and ramps to its maximum value in approximately 1 second. The gust causes the measured airspeed, shown in FIG. 5B, to rise from the commanded airspeed of 200 kts to approximately 207 kts at around 7.5 seconds. FIG. 5C shows that groundspeed also decreases, as expected. In response to the increased airspeed, control system 23 commands a change in an actuator or other device to affect the airspeed. In this example, throttle position is used to control engine power, and the throttle position is initially reduced in order to achieve the original airspeed. However, the throttle position, as shown in FIG. 5D, is decreased from about 36 degrees just before the gust is encountered to about 30 degrees afterward at approximately 7 seconds. The throttle position then smoothly ramps up to approximately 62 degrees while the airspeed and groundspeed smoothly settle at the new values. The system settles out in approximately 15 seconds from the beginning of the gust. As shown by the graph in FIG. 5E, a reduction is also realized for the vertical accelerations and motions.

When compared to the responses of the prior-art system 11, it should be noted that the graphs in FIGS. 5B through 5D lack the undershoot and overshoot found in the response of the prior-art system. When the system gently settles to the new values without these oscillations, passenger ride comfort is increased.

Figure 6A:
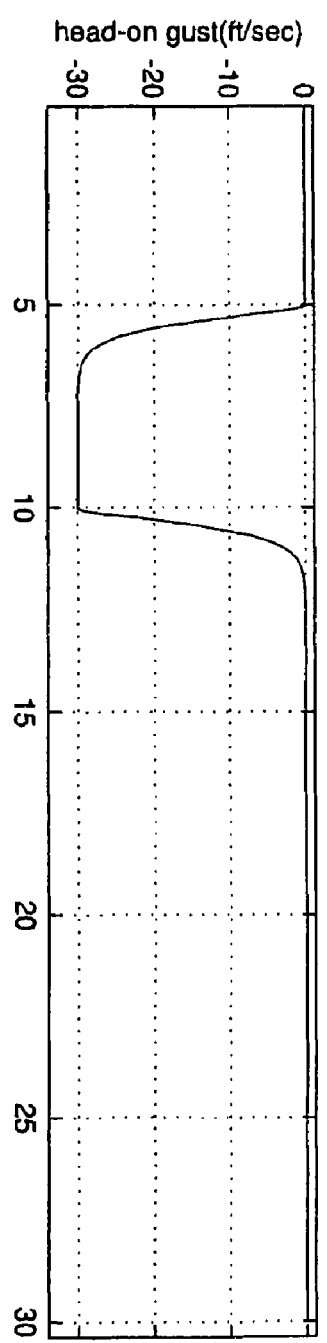
FIGS. 6A through 6E are graphs over time of the input and response for a transient head-on gust using the system of FIG. 4.
Figure 6B:
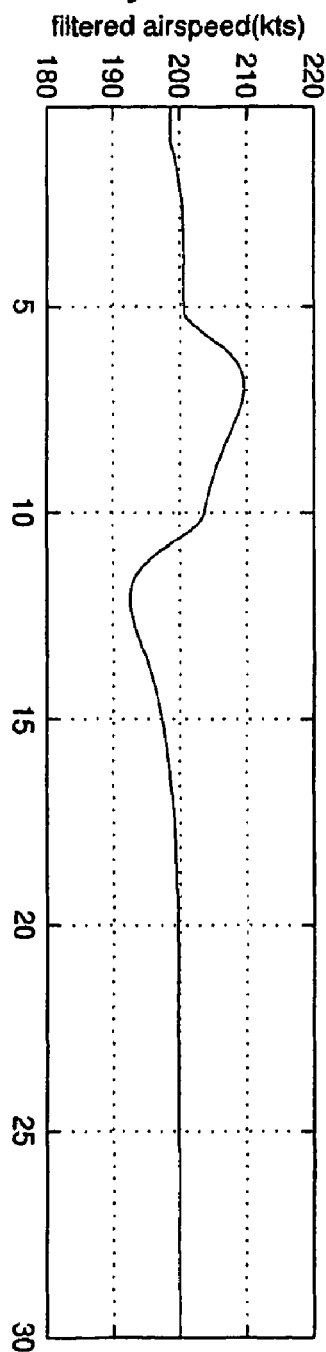
Figure 6C:
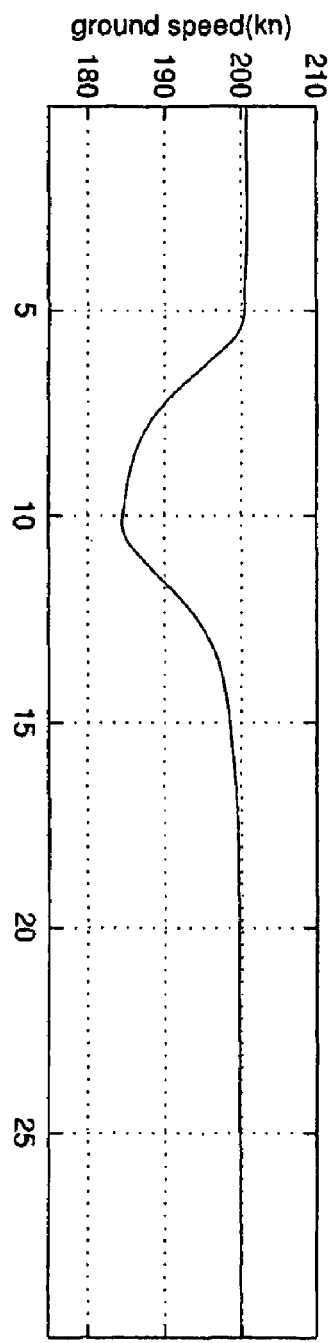
Figure 6E:
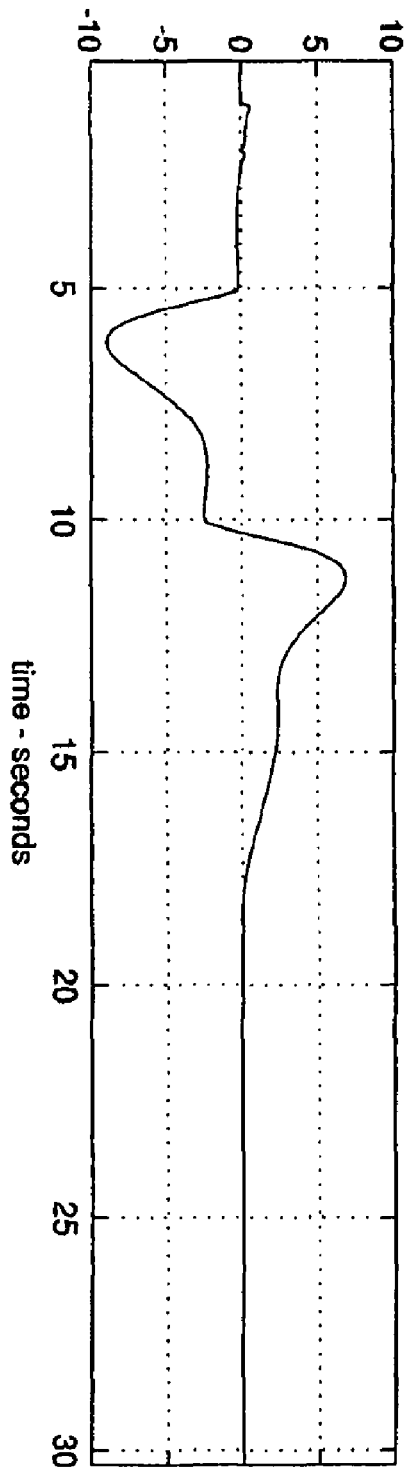
Figure 6D:
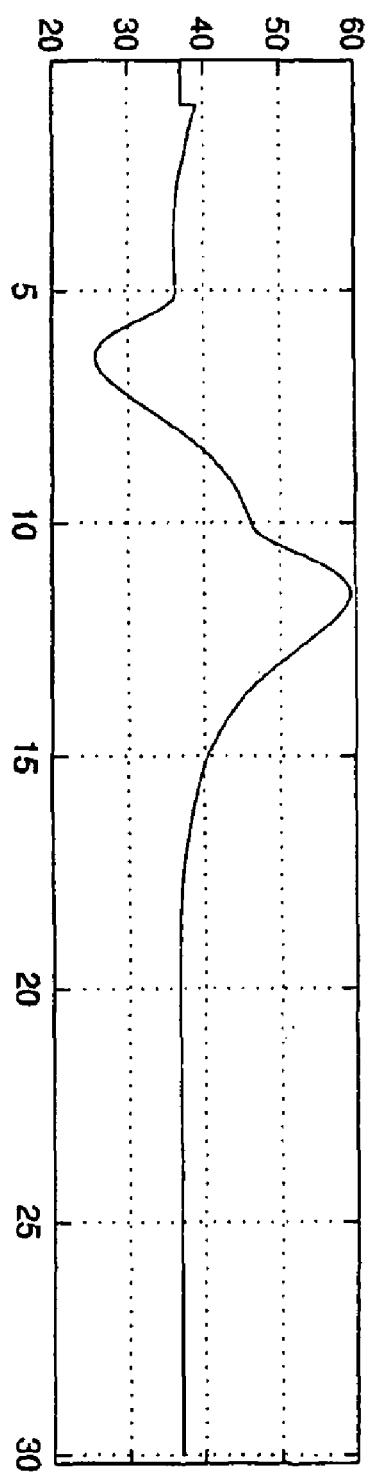

The same improvements are also seen in the responses to a transient wind gust, as shown in FIGS. 6A through 6E. A 30 ft/sec head-on gust is encountered at time=5 seconds, and the gust lasts for 5 seconds. FIG. 6B shows the measured airspeed peaks at 210 kts at around 7 seconds and undershoots to about 194 kts at around 12 seconds. The groundspeed, shown in FIG. 6C, has a maximum decrease of approximately 15 kts at approximately 10 seconds, but the groundspeed recovers after the gust without an overshoot. Referring now to FIG. 6D, the throttle position changes from an initial setting of 36 degrees to approximately 26 degrees in response to the gust, then increases to near 60 degrees to increase the airspeed after the gust has ended. The throttle position then settles back to approximately 36 degrees without undershoot. The system response settles in approximately 15 seconds from the beginning of the gust.

Comparing the response of the system of the present invention to the responses shown in FIGS. 3B through 3E for the prior-art system, it should be noted that the system of the present invention reduces the maximum deviations from the pre-gust conditions without the undershoot and overshoot seen in the responses of the prior-art system. Also, the system settles sooner than the prior-art system, and the longitudinal accelerations, graphed in FIG. 6E last for a shorter time. All of these contribute to improving the ride comfort of the passengers on the aircraft.

Figure 7:
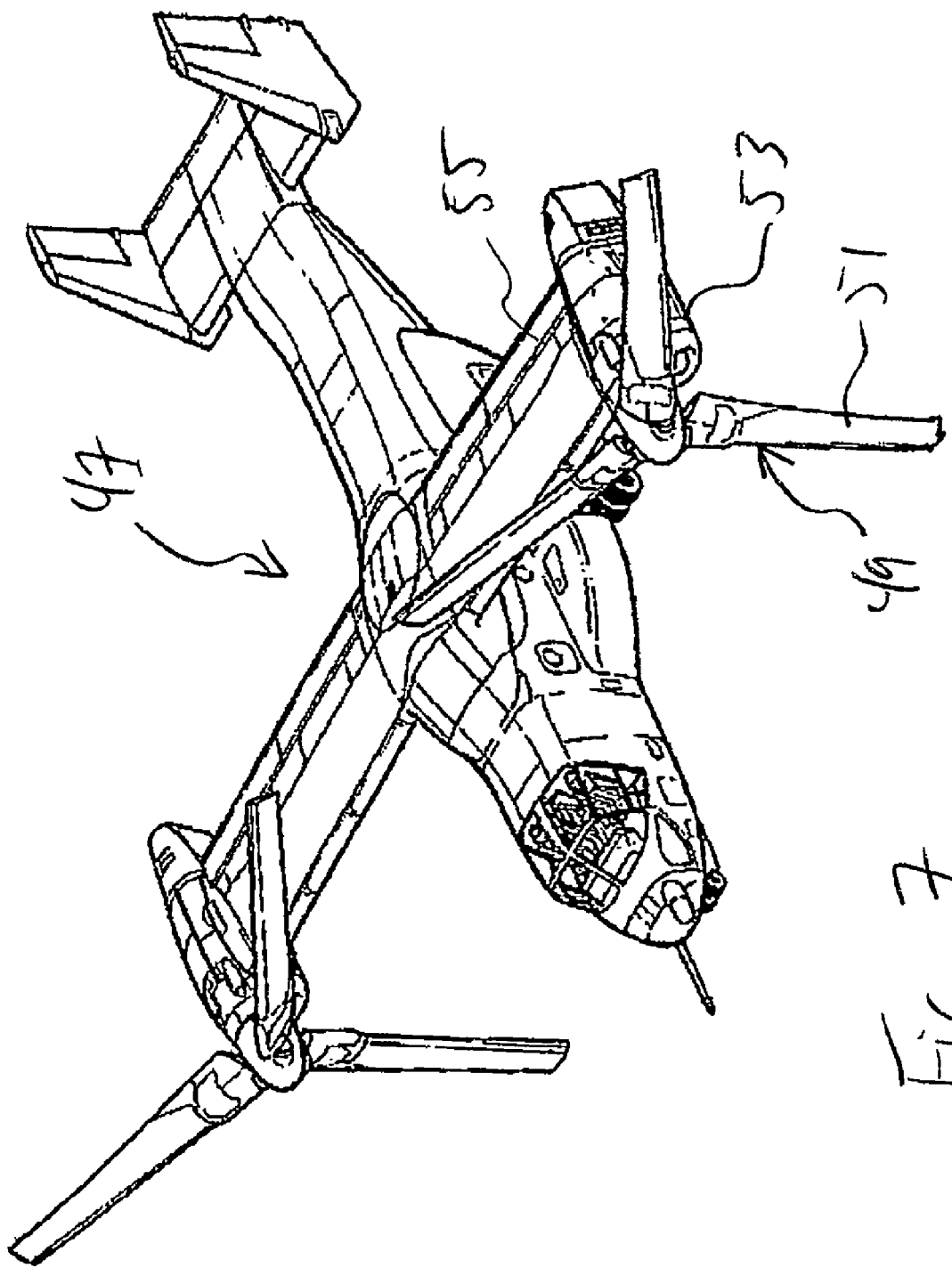
FIG. 7 is a perspective view of an aircraft comprising the flight control system of FIG. 4.

The devices on the aircraft used to control the airspeed may be of various types depending on the type of aircraft. For example, FIG. 7 shows a tiltrotor aircraft 47 having an airspeed control system according to the present invention. Aircraft 47 has two rotors 49 having multiple blades 51, and each rotor 49 is rotated with torque provided from an engine carried in an associated nacelle 53. Each nacelle 53 is pivotally mounted to the outer end of a wing 55 of aircraft 47, allowing for each nacelle 53 to rotate between a horizontal position, as shown in the figure, and a vertical position. Each engine has means (not shown) for controlling the power output and/or speed of the engine, and these means are collectively referred to herein as a "throttle."

While shown as a tiltrotor aircraft, it should be understood that airspeed control system 23 of the present invention is applicable to all types of aircraft, including fixed-wing aircraft and helicopters. In addition, though the engines of aircraft 47 are turbine engines, system 23 of the invention is also applicable to other types of aircraft engines, including reciprocating engines. Also, though throttles are primarily used to control the output of engines on aircraft 47, control system 23 may be used to control other devices for controlling the amount or direction of thrust produced by rotors 49. For example, control system 23 may be used to control the rotational position of nacelles 53 or the pitch of blades 51. In other types of aircraft, control system 23 may be used to control airspeed through the use of thrust-vectoring devices, such as those used to direct turbine exhaust.

Figure 8:
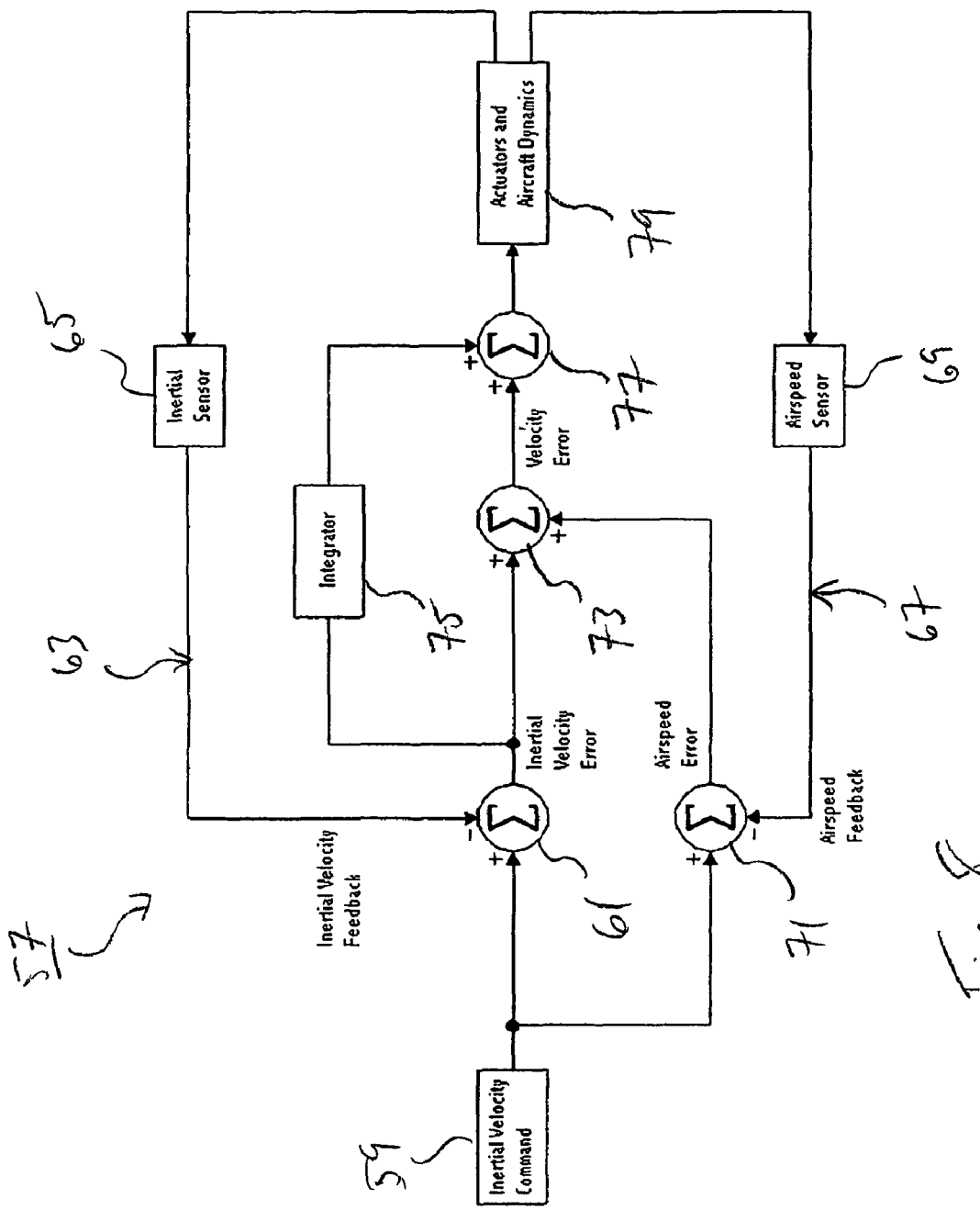
FIG. 8 is an alternative embodiment of the flight control system of the present invention.

FIG. 8 is a schematic view of an alternative embodiment of the control system of the present invention. Control system 57 is configured for maintaining a commanded inertial velocity, or groundspeed, rather than maintaining a commanded airspeed, as was system 23 of FIG. 4 above.

System 57 is a closed-loop feedback system that uses both airspeed and inertial velocity (ground speed) to determine the appropriate throttle response to changes in inertial velocity. In the system shown, a selected inertial velocity signal is output from a command device 59, which may be an onboard interface used by a pilot or a control system, such as an autopilot system. Alternatively, command device 59 may interface with a receiver that receives commands transmitted from a location remote from the aircraft. The inertial velocity command signal is summed at node 61 with a signal output from inertial velocity feedback loop 63, which is the primary feedback loop in this embodiment. An inertial velocity sensor 65 is in data communication with inertial velocity feedback loop 63 for providing a signal representing the measured inertial velocity of the aircraft, and the negative value of the measured inertial velocity is summed with the commanded inertial velocity at node 61 to calculate an inertial velocity error signal. Likewise, an airspeed feedback loop 67, which is the secondary feedback loop in this embodiment, provides a signal representing a value of airspeed measured by an airspeed sensor 69 in data communication with feedback loop 67. The negative value of the airspeed measured by sensor 69 is summed with the commanded inertial velocity at node 71 to calculate an airspeed error.

The inertial velocity error calculated at node 61 is used in two subsequent calculations. The airspeed error (calculated at node 71) is summed with the positive value of the inertial velocity error at node 73 to calculate a velocity error. The integral value of the inertial velocity error is calculated using integrator 75, and the positive value of this integral value is summed with the positive value of the velocity error at node 77. The output signal from node 77 represents the actuator command signal used by actuators or other devices represented by box 79 for controlling the airspeed of the aircraft such that the inertial velocity error is minimized.

The combination of an airspeed signal and an inertial velocity signal as the velocity feedback signal will reduce the amplitude of the changes commanded by system 57 caused by air turbulence. When a wind gust is encountered, sensors 65, 69 detect velocity changes in opposite directions. The proportional velocity error is computed using these two signals, so the undesirable power or thrust surge is significantly less due to the cancellation effects. However, the low frequency, or steady-state, inertial velocity error used for the integral of velocity error is determined by the inertial velocity sensor only, so the steady velocity is not affected by the airspeed signal.

For example, an aircraft using an inertial velocity control system may encounter air that is moving in the opposite direction of the aircraft. When this occurs, the inertial velocity sensor will detect a decrease in the inertial velocity due to the increased aerodynamic drag. The inertial velocity control system is commanded to maintain a constant inertial velocity, and the system will operate devices on the aircraft so as to attain and maintain the original inertial velocity.

The present invention provides for several advantages, including: (1) reduction of unwanted longitudinal acceleration caused by automatic responses to head-on gusts and air turbulence; (2) reduction of the automatic engine power changes caused as a response to air turbulence; (3) increase of the stability for a flight control system, thus reducing the overshoots and undershoots caused by turbulence and commanded changes; and (4) improvement of the efficiency of the aircraft by reducing accelerations caused by the air turbulence.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A flight control system for an aircraft, the system comprising:
   means for receiving an input signal representing a selected value of a first parameter, the first parameter being one of the airspeed of the aircraft and inertial velocity of the aircraft;
   a primary feedback loop for generating a primary error signal, the primary error signal being proportional to the difference between the selected value of the first parameter and a measured value of the first parameter; and
   a secondary feedback loop for generating a secondary error signal, the secondary error signal being proportional to the difference between the selected value of the first parameter and a measured value of a second flight parameter, the second parameter being the other of the airspeed of the aircraft and inertial velocity of the aircraft;
   wherein the primary error signal and the secondary error signal are summed to produce a velocity error signal;
   a bypass for integrating the primary error signal with the velocity error signal to produce an actuator command signal, and
   wherein the actuator command signal is adapted to be used for operating devices on the aircraft to control the first parameter of the aircraft, such that the primary error signal is minimized.

2. The control system according to claim 1, wherein the means for receiving the input signal are configured for receiving an input signal generated onboard the aircraft.

3. The control system according to claim 1, wherein the means for receiving the input signal are configured for receiving an input signal generated remote from the aircraft.

4. The control system according to claim 1, wherein the first parameter is the airspeed of the aircraft and the second parameter is the inertial velocity of the aircraft.

5. The control system according to claim 1, wherein the first parameter is the inertial velocity of the aircraft and the second parameter is the airspeed of the aircraft.

6. The control system according to claim 1, wherein the actuator command signal is adapted to be used for operating devices selected from the group consisting of throttles, rotor system controls, and nacelle position controls.

7. An aircraft, comprising:
   propulsion means for propelling the aircraft;
   at least one device configured for controlling a thrust output of the propulsion means; and
   a flight control system, comprising:
      means for receiving an input signal representing a selected value of a first parameter, the first parameter being one of the airspeed of the aircraft and inertial velocity of the aircraft;
      a primary feedback loop for generating a primary error signal, the primary error signal being proportional to the difference between the selected value of the first parameter and a measured value of the first parameter; and
      a secondary feedback loop for generating a secondary error signal, the secondary error signal being proportional to the difference between the selected value of the first parameter and a measured value of a second flight parameter, the second parameter being the other of the airspeed of the aircraft and inertial velocity of the aircraft;
      wherein the primary error signal and the secondary error signal are summed to produce a velocity error signal;
      a bypass for integrating the primary error signal with the velocity error signal to produce an actuator command signal, and
   wherein the actuator command signal is used for operating the at least one device to control the first parameter of the aircraft, such that the primary error signal is minimized.

8. The aircraft according to claim 7, wherein the at least one device comprises at least one throttle.

9. The aircraft according to claim 7, wherein the at least one device comprises at least one actuator for vectoring thrust.

10. The aircraft according to claim 7, wherein the means for receiving the input signal are configured for receiving an input signal generated onboard the aircraft.

11. The aircraft according to claim 7, wherein the means for receiving the input signal are configured for receiving an input signal generated remote from the aircraft.

12. The aircraft according to claim 7, wherein the first parameter is the airspeed of the aircraft and the second parameter is the inertial velocity of the aircraft.

13. The aircraft according to claim 7, wherein the first parameter is the inertial velocity of the aircraft and the second parameter is the airspeed of the aircraft.

14. A method for automatically controlling the flight of an aircraft, the method comprising:
   a) inputting a signal representing a selected value of a first parameter, the first parameter being one of the airspeed of the aircraft and the inertial velocity of the aircraft;
   b) generating a primary error signal by calculating the difference between the selected value of the first parameter and a measured value of the first parameter;
   c) generating a secondary error signal by calculating the difference between the selected value of the first parameter and a measured value of a second parameter, the second parameter being the other of the airspeed of the aircraft and the inertial velocity of the aircraft;

d) generating a velocity error signal by summing the primary error signal and the secondary error signal;

e) generating an actuator command signal by summing the primary error signal with the velocity error signal; then f) operating devices on the aircraft to control the first parameter of the aircraft, such that the primary error signal is minimized.

15. The method according to claim 14, wherein the first parameter is the airspeed of the aircraft and the second parameter is the inertial velocity of the aircraft.

16. The method according to claim 14, wherein the first parameter is the inertial velocity of the aircraft and the second parameter is the airspeed of the aircraft.

* * * * *